(12) United States Patent
Hayakawa et al.

(10) Patent No.: US 7,561,377 B2
(45) Date of Patent: Jul. 14, 2009

(54) DISK DRIVE DISK CLAMPING VIA A HUB FLANGE, A CLAMP, AND AN O-RING

(75) Inventors: Takako Hayakawa, Kanagawa (JP); Kouki Uefune, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 382 days.

(21) Appl. No.: 11/403,133

(22) Filed: Apr. 11, 2006

(65) Prior Publication Data
US 2006/0232881 A1     Oct. 19, 2006

(30) Foreign Application Priority Data
Apr. 18, 2005     (JP) ............................. 2005-119989

(51) Int. Cl.
*G11B 17/022*     (2006.01)
(52) U.S. Cl. .................................... 360/99.12
(58) Field of Classification Search .............. 360/98.08, 360/99.12
See application file for complete search history.

(56) References Cited

U.S. PATENT DOCUMENTS

| | | | | |
|---|---|---|---|---|
| 5,367,418 | A * | 11/1994 | Chessman et al. | 360/99.12 |
| 5,459,627 | A * | 10/1995 | Peter | 360/98.08 |
| 5,493,462 | A * | 2/1996 | Peter | 360/99.12 |
| 5,559,651 | A * | 9/1996 | Grantz et al. | 360/99.08 |
| 5,781,374 | A * | 7/1998 | Moir et al. | 360/99.12 |
| 5,943,184 | A * | 8/1999 | Kelsic et al. | 360/98.08 |
| 6,624,968 | B1 * | 9/2003 | Chessman et al. | 360/99.12 |
| 6,967,814 | B1 * | 11/2005 | Chessman et al. | 360/99.12 |
| 7,181,824 | B1 * | 2/2007 | Suwito et al. | 29/603.03 |

FOREIGN PATENT DOCUMENTS

EP     0653750     5/1995

(Continued)

OTHER PUBLICATIONS

"O-Ring clamping Spindle Motor," IBM Technical Disclosure Bulletin 37:343 (Feb. 1994).

(Continued)

*Primary Examiner*—Jefferson Evans
(74) *Attorney, Agent, or Firm*—Townsend and Townsend and Crew LLP; Patrick Duncan (57) ABSTRACT

Embodiments of the invention provide a small, thin, yet reliable magnetic disk drive. In one embodiment, a magnetic disk drive comprises: a motor hub including a disk support portion and a flange portion, the disk support portion supporting a magnetic disk thereon, the flange portion being located higher than the disk support portion and protruding radially outward with respect to a rotational center of the magnetic disk; a clamp having a ring shape and including an inclined undersurface inclined downward from the outer circumference of the ring shape toward the inner circumference of the ring shape, the ring shape encircling the flange portion, the clamp being engaged around the outer circumference of the flange portion; and an O-ring engaged with the inclined undersurface of the clamp so as to press the clamp against the flange portion or clamp the clamp, the O-ring being further engaged with the magnetic disk so as to press the magnetic disk against the disk support portion.

15 Claims, 6 Drawing Sheets

FOREIGN PATENT DOCUMENTS

| | | |
|---|---|---|
| JP | 07-262748 | 10/1995 |
| JP | 08-297944 | 11/1996 |
| JP | 08-321107 | 12/1996 |
| JP | 09-106622 | 4/1997 |
| JP | 09-115216 | 5/1997 |
| JP | 09-115234 | 5/1997 |
| JP | 09-115236 | 5/1997 |
| JP | 09-120610 | 5/1997 |
| JP | 2001-148187 | 5/2001 |
| JP | 2004-118935 | 4/2004 |
| JP | 2004-335046 | 11/2004 |
| JP | 2006-040428 | 2/2006 |

OTHER PUBLICATIONS

The extended European Search Report corresponding to the Application No. 06252105.9-1232, date of mailing Dec. 5, 2008, 11 pages total.

"O-ring Clamping Spindle Motor" IBM Technical Disclosure Bulletin, IBM Corp. New York, US, vol. 37, No. 2B, Feb. 1, 1994, p. 343, XP000433871; ISSN: 0018-8689.

* cited by examiner

DISK DRIVE DISK CLAMPING VIA A HUB FLANGE, A CLAMP, AND AN O-RING

CROSS-REFERENCES TO RELATED APPLICATIONS

This application claims priority from Japanese Patent Application No. JP2005-119989, filed Apr. 18, 2005, the entire disclosure of which is incorporated herein by reference.

BACKGROUND OF THE INVENTION

The present invention relates to a magnetic disk drive, and more particularly to a clamp for fixing a magnetic disk to a motor hub.

In a magnetic disk drive such as a hard disk drive, the magnetic disk to which data is written is fixed to the motor hub.

One conventional method for attaching the magnetic disk to the motor hub includes the steps of placing the magnetic disk on the disk support portion of the motor hub, placing a disk-spring-shaped metal clamp on the magnetic disk, and fixing the clamp to the motor hub with a screw(s) to hold the magnetic disk between the clamp and the disk support portion. See, e.g., Patent Document 1 (Japanese Patent Laid-Open No. 2001-148187).

Another conventional method for attaching the magnetic disk to the motor hub is to shrinkage fit the clamp onto the motor hub without using screws. See, e.g., Patent Document 2 (Japanese Patent Laid-Open No. 08-297944 (1996)). Specifically, according to this method, after placing the magnetic disk on the disk support portion of the motor hub, a ring-shaped metal clamp is placed on the disk such that the clamp is engaged with the outer circumference of the motor hub. When the ring-shaped metal clamp is placed on the magnetic disk, thermal energy is applied to the clamp such that the inside diameter of the clamp becomes larger than the outside diameter of the motor hub due to the thermal distortion of the clamp. After that, the ring-shaped clamp is cooled, causing the clamp to shrink. As a result, the clamp clamps the motor hub, and hence the magnetic disk is fixed between the clamp and the disk receiving surface of the motor hub.

BRIEF SUMMARY OF THE INVENTION

The above attaching method using a screw(s) is disadvantageous in that the magnetic disk is subjected to distortion when the clamp is fixed with a screw(s). If a plurality of screws are used to fix the clamp, as many undulations as there are screws are formed in the circumferential direction of the magnetic disk due to such distortion, resulting in a degradation in the flying characteristics of the magnetic head with respect to the magnetic disk. This may degrade the head positioning accuracy or might cause contact between the magnetic head and the magnetic disk. These undulations are more problematic with small devices, since they employ small and thin magnetic disks. Further, the screws must have sufficient strength, requiring that the width of their head portion be larger than a certain thickness. Such a requirement is a factor in preventing magnetic disk drives from being reduced in size and thickness.

On the other hand, the above attaching method using a shrinkage fitting technique is effective in preventing formation of undulations in the magnetic disk due to distortion attributed to a plurality of mounting screws. However, this method has another problem. Miniaturizing a magnetic disk drive requires reducing the size and thickness of its clamp. This means that the amount of distortion of the clamp introduced by the thermal energy is small when this method is applied to small magnetic disk drives, making it difficult for the clamp to exert force large enough that the magnetic disk is reliably fixed between the clamp and the motor hub.

It is, therefore, a feature of the present invention to provide a small and thin magnetic disk drive in which the magnetic disk is reliably fixed to the motor hub and prevented from being distorted.

An embodiment of the present invention provides a magnetic disk drive comprising: a motor hub including a disk support portion and a flange portion, the disk support portion supporting a magnetic disk thereon, the flange portion being located higher than the disk support portion and protruding radially outward with respect to a rotational center of the magnetic disk; a clamp having a ring shape and including an inclined undersurface inclined downward from the outer circumference of the ring shape toward the inner circumference of the ring shape, the ring shape encircling the flange portion, the clamp being engaged around the outer circumference of the, flange portion; and an O-ring engaged with the inclined, undersurface of the clamp so as to press the clamp against the flange portion or clamp the clamp, the O-ring being further engaged with the magnetic disk so as to press the magnetic disk against the disk support portion.

DETAILED DESCRIPTION OF THE INVENTION

Figure 1:
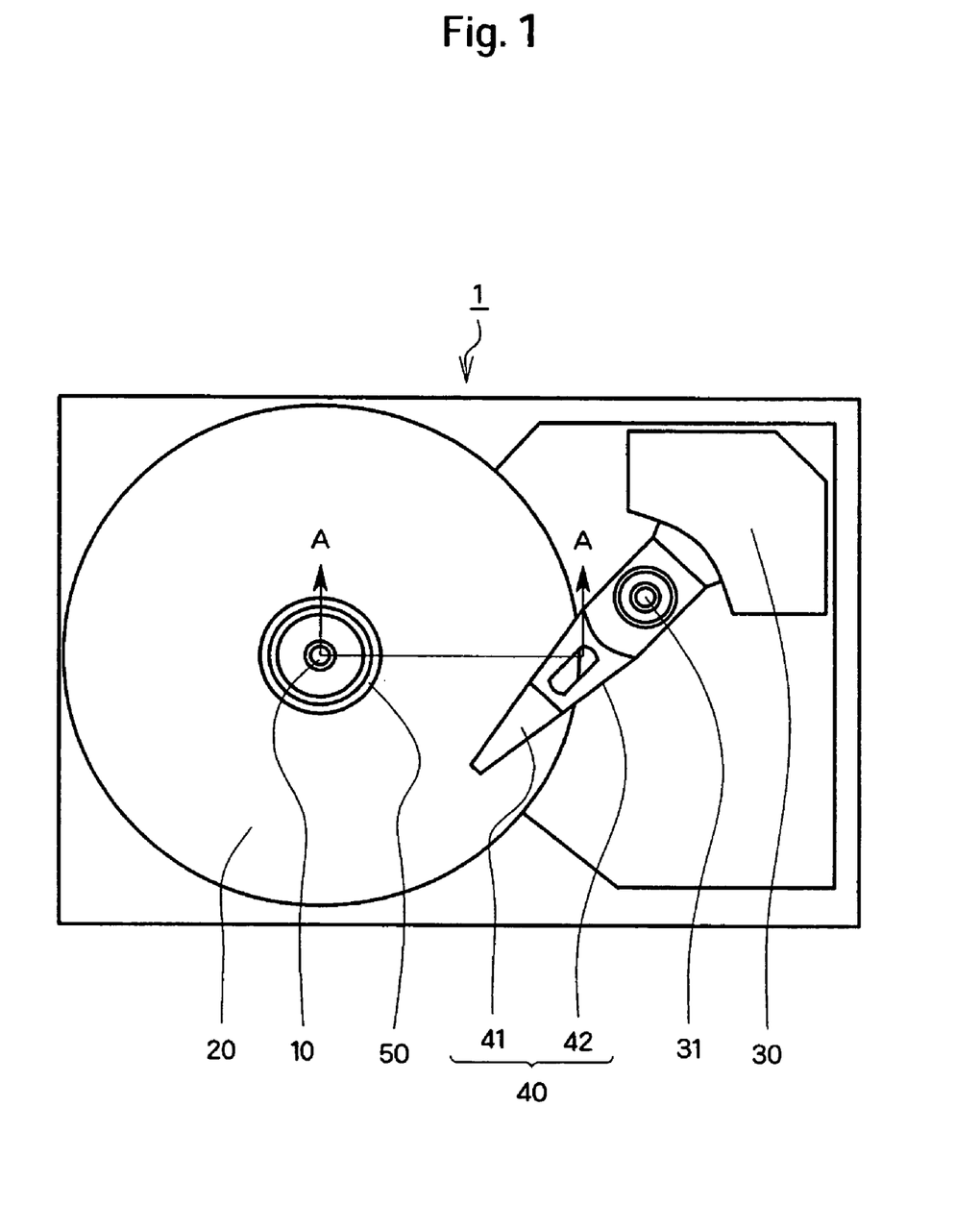
FIG. 1 is a plan view showing the basic configuration of a magnetic disk drive according to an embodiment of the present invention.

There will now be described a magnetic disk drive according to an embodiment of the present invention with reference to the accompanying drawings. FIG. 1 is a plan view showing the basic configuration of the magnetic disk drive of the present embodiment.

As shown in the figure, a magnetic disk drive 1 comprises: a magnetic disk 20 to which data is written; and an actuator 40 having on its tip a magnetic head (not shown) for writing/reading data to/from the magnetic disk 20. The magnetic disk 20 is rotatably supported by a spindle motor 10, and the actuator 40 is pivotably supported by a VCM (Voice Coil Motor) 30 around a pivot 31.

The magnetic disk 20 is fixed by a clamp 50 to the motor hub (not shown) attached to the spindle motor 10. The mechanism for fixing the magnetic disk 20 to the motor hub by use of the clamp 50 will be described later in detail.

The actuator 40 includes: a suspension 41 with moderate flexibility having a magnetic head (not shown) on its tip in such a way that the magnetic head flies above the magnetic disk 20; an arm 42 attached to the pivot 31 and supporting the suspension 41; and a coil (not shown) for receiving force from the VCM 30.

Figure 2:
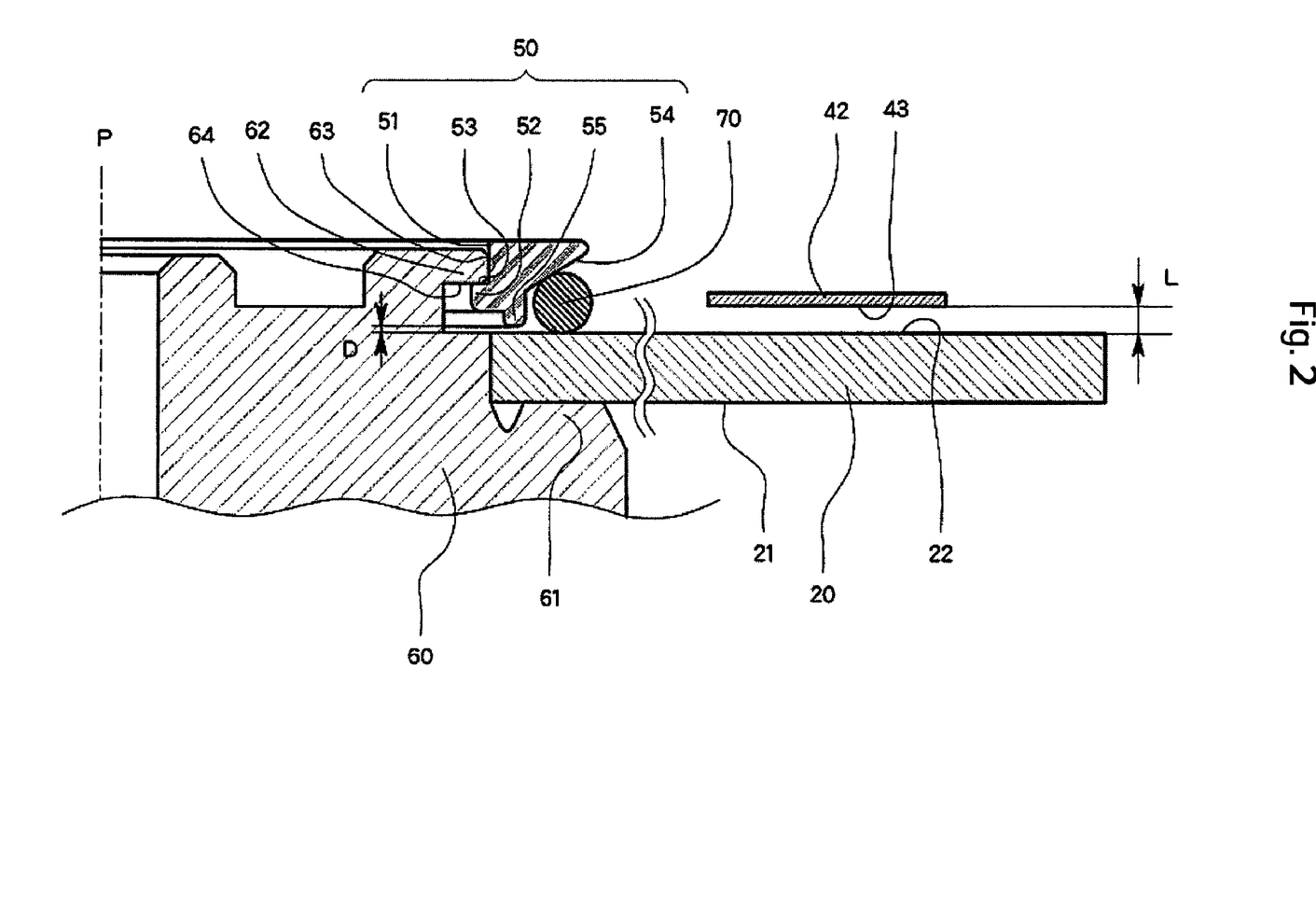
FIG. 2 is a cross-sectional view of the magnetic disk drive in FIG. 1 taken along line A-A.

FIG. 2 is a cross-sectional view of the magnetic disk drive 1 in FIG. 1 taken along line A-A. As shown in FIG. 2, the motor hub 60 of the magnetic disk drive 1 includes: a disk support portion 61 engaged with the undersurface 21 of the magnetic disk 20 and supporting the magnetic disk 20 thereon; and a flange portion 62 located higher than the disk support portion 61 and protruding radially outward with respect to the central rotational axis P of the magnetic disk 20.

It should be noted that the motor hub 60 is made of a material allowing for high precision machining to reduce the distortion of the magnetic disk 20 that the motor hub 60 supports. For example, the motor hub 60 may be formed of stainless steel, preferably martensitic or ferritic free-cutting steel.

The clamp 50 is a ring-shaped member, and an inner circumferential surface 51 of the ring shape or the clamp 50 is engaged with the outer circumferential end face 63 of the flange portion 62 of the motor hub 60 such that the clamp 50 clamps the flange portion 62 from all directions.

Further, the clamp 50 includes a shoulder portion 52 disposed under the inner circumferential surface 51 and protruding from the inner circumferential surface 51 toward the inner circumferential side (that is, toward the central rotational axis P). A top surface 53 of the shoulder portion 52 is engaged with an undersurface 64 of the flange portion 62.

The clamp 50 also has an inclined undersurface 54 inclined downward from the outer circumferential, edge of the ring shape (or the clamp 50) toward the inner circumferential side.

Further, the clamp 50 also includes a stopper 55 having a convex cross-sectional shape and protruding downward from the lowermost portion of the inclined undersurface 54.

The stopper 55 and the top surface 22 of the magnetic disk 20 face each other with a distance of D therebetween.

It should be noted that the clamp 50 is formed of a resin material, for example, a synthetic resin material such as polyacetal (polyoxymethylene, or POM) or a polyamide resin (nylon, etc).

An O-ring 70 is inserted between the clamp 50 and the magnetic disk 20 such that it is engaged with the inclined undersurface 54 of the clamp 50 and the top surface 22 of the magnetic disk 20.

The O-ring 70 applies stress to the inclined undersurface 54 so as to press the inclined undersurface 54 toward the central rotational axis P and thereby cause the clamp 50 to clamp the flange portion 62.

While applying the above stress to the inclined undersurface 54 so as to press it toward the central rotational axis P, the O-ring 70 also applies stress to the top surface 22 of the magnetic disk 20 so as to press the magnetic disk 20 against the disk support portion 61.

That is, as shown in FIG. 2, the O-ring 70 is engaged with the top surface 22 of the magnetic disk 20 at a position directly above the portion (the disk support surface) of the disk support portion 61 engaged with the magnetic disk 20 so as to press the magnetic disk 20 against the disk support portion 61, and at the same time the O-ring 70 is also engaged with the inclined surface 54 of the clamp 50 so as to press the clamp 50 against the flange portion 62 or clamp the clamp 50.

As a result, the magnetic disk 20 is held between the O-ring 70 and the disk support portion 61.

It should be noted that the O-ring 70 is formed of a resin material, for example, a rubber material such as fluoride rubber etc.

In the load state in which the magnetic head (not shown) is caused to fly over the top surface 22 of the magnetic disk 20 for data read or write operation, the undersurface 43 of the arm 42 of the actuator 40 is held at a distance of L from the magnetic disk top surface 22.

The above distance D between the stopper 55 of the clamp 50 and the magnetic disk top surface 22 is set to be considerably smaller than the distance L between the arm 42 of the actuator 40 and the magnetic disk top surface 22.

This prevents contact between the top surface 22 of the magnetic disk 20 and the arm undersurface 43 of the actuator 40 even when an external vibration, etc. applied to the magnetic disk drive 1 causes the rotating magnetic disk 20 to distort the O-ring 70 and move upward, since the upward movement of the magnetic disk 20 is restricted by the stopper 55 of the clamp 50.

Figure 3:
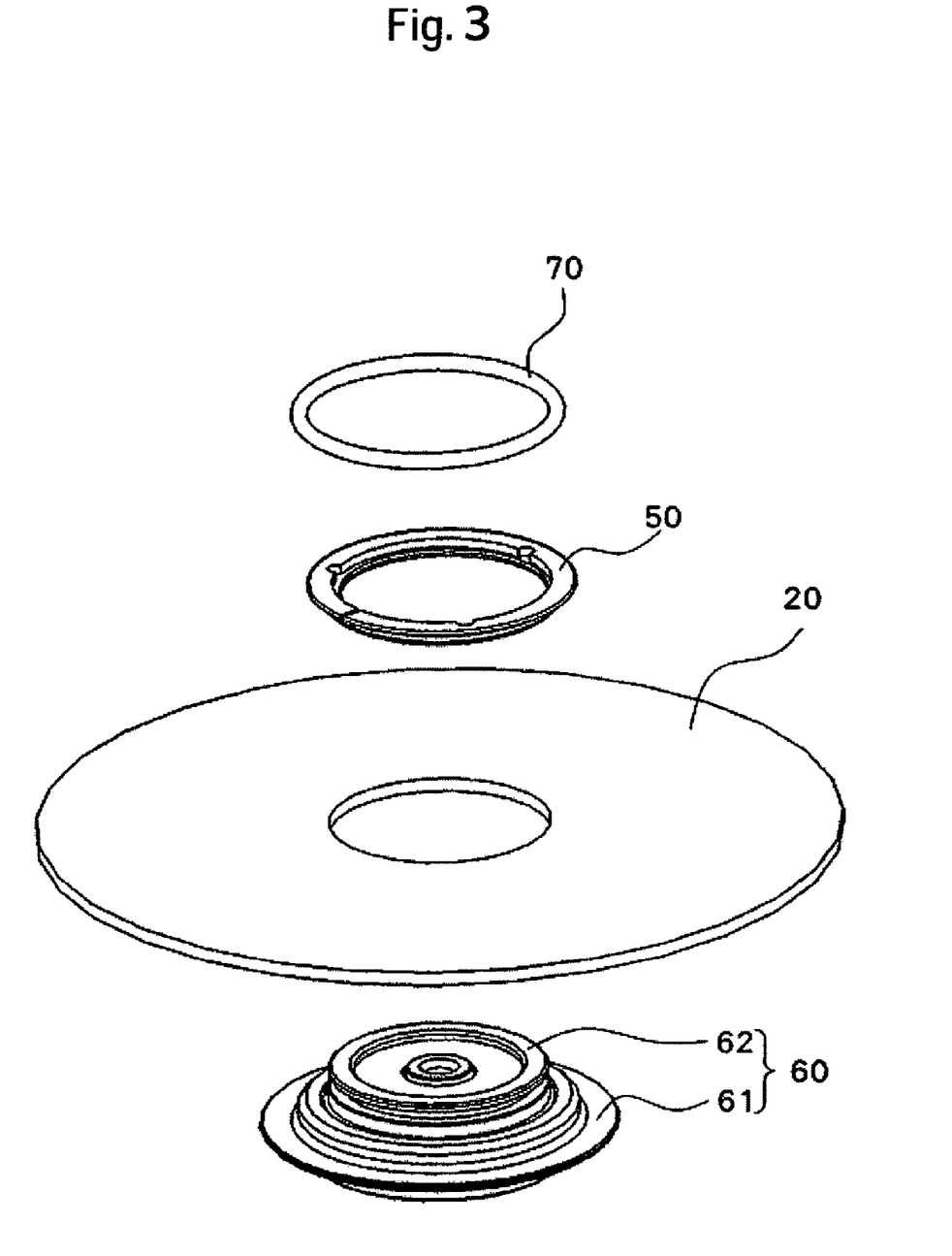
FIG. 3 shows perspective views of a motor hub, a magnetic disk, a clamp and an O-ring according to the embodiment.

There will now be described a procedure for attaching the magnetic disk 20 to the motor hub 60 by use of the clamp 50 and the O-ring 70. FIG. 3 shows perspective views of the motor hub 60, the magnetic disk 20, the clamp 50, and the O-ring 70.

The following steps are performed to attach the magnetic disk 20 to the motor hub 60. First, the magnetic disk 20 is placed on the disk support portion 61 of the motor hub 60. That is, as shown in FIG. 3, the magnetic disk 20 is placed on the disk support portion 61 from above the motor hub 60 such that the flange portion 62 of the motor hub 60 is inserted into the through-hole formed at the center of the magnetic disk 20. The diameter of the through-hole is approximately equal to the outside diameter of the flange portion 62.

Figure 4:
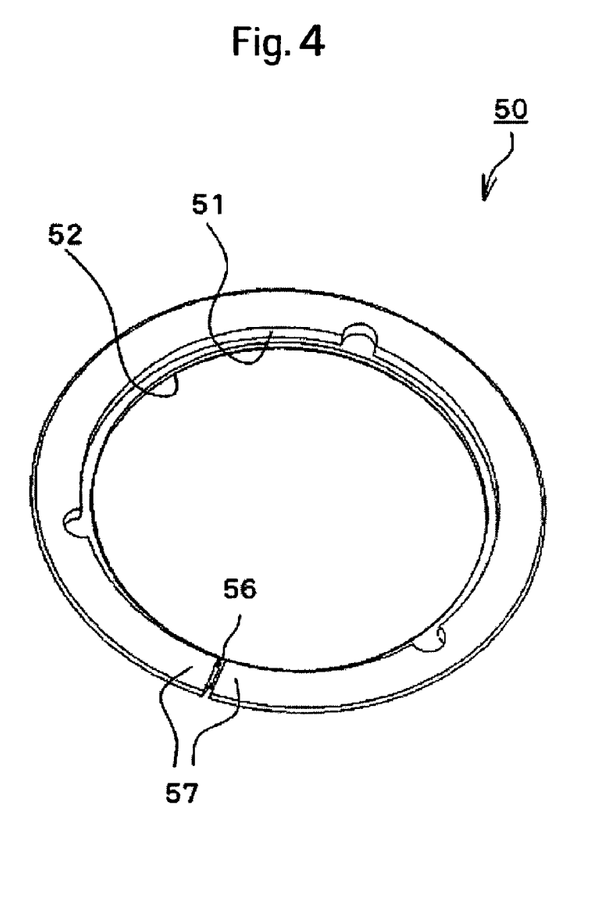
FIG. 4 is a perspective view of an exemplary clamp of the embodiment as viewed from above.
Figure 5:
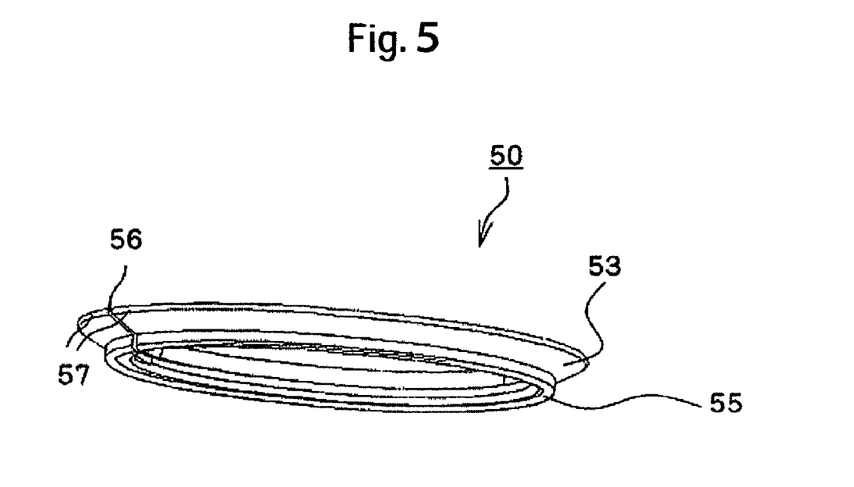
FIG. 5 is a perspective view of the exemplary clamp of the embodiment as viewed from beneath.

With the magnetic disk 20 held on the disk support portion 61 of the motor hub 60, the clamp 50 is mounted on the motor hub 60 from above. FIGS. 4 and 5 are perspective views of the clamp 50 viewed from above and beneath, respectively.

As shown in FIGS. 4 and 5, the clamp 50 is a C-shaped ring member. That is, the clamp 50 includes a slit 56 which provides a separation in the circumference of the ring shape of the clamp 50.

When the clamp 50 is mounted around the flange portion 62 of the motor hub 60, the clamp 50 is stretched so as to increase the distance between the two facing end portions 57 of the ring shape formed as a result of forming the slit 56 (that is, so as to increase the width of the slit 56 which separates the two end portions 57). This facilitates increasing the inside diameter of the clamp 50 (or the diameter of the inner circumferential surface 51).

Thus, the clamp 50 is stretched radially outward, allowing the clamp 50 to be mounted around the flange portion 62 even though the inside diameter of the shoulder portion 52 of the clamp 50 in a relaxed position is smaller than the outside diameter of the flange portion 62 (see FIGS. 2 and 4).

As a result of this mounting operation, as shown in FIG. 2, the shoulder 52 of the clamp 50 goes around the flange portion 62, reaches under the flange portion 62, and engages with the undersurface 64 of the flange portion 62. At the same time, the inner circumferential surface 51 engages with the outer circumferential end face 63 of the flange portion 62 such that the clamp 50 presses the outer circumference of the flange portion 62 toward the central rotational axis P or clamps the flange portion 62.

Then, the O-ring 70 as shown in FIG. 3 is attached from above the clamp 50 fixed to the flange portion 62.

Specifically, the O-ring 70, which has an inside diameter in a relaxed position smaller than the outside diameter of the clamp 50, is mounted around the inclined undersurface 54 of the clamp 50 from above the clamp 50 by stretching the O-ring 70 so as to increase its inside diameter (see FIG. 2).

As a result of this mounting operation, as shown in FIG. 2, the O-ring 70 is inserted between the clamp 50 and the magnetic disk 20 and thereby engaged with the inclined undersurface 54 of the clamp 50 and the top surface 22 of the magnetic disk 20. The O-ring 70, by virtue of its elasticity, presses the clamp 50 against the flange portion 62 or clamps the clamp 50 and furthermore presses the magnetic disk 20 against the disk support portion 61 of the motor hub 60.

Thus, the above attaching process allows the magnetic disk 20 to be held between the clamp 50 and the disk support portion 61 of the motor hub 60 and between the O-ring 70 and the disk support portion 61, as shown in FIG. 2.

Figure 6:
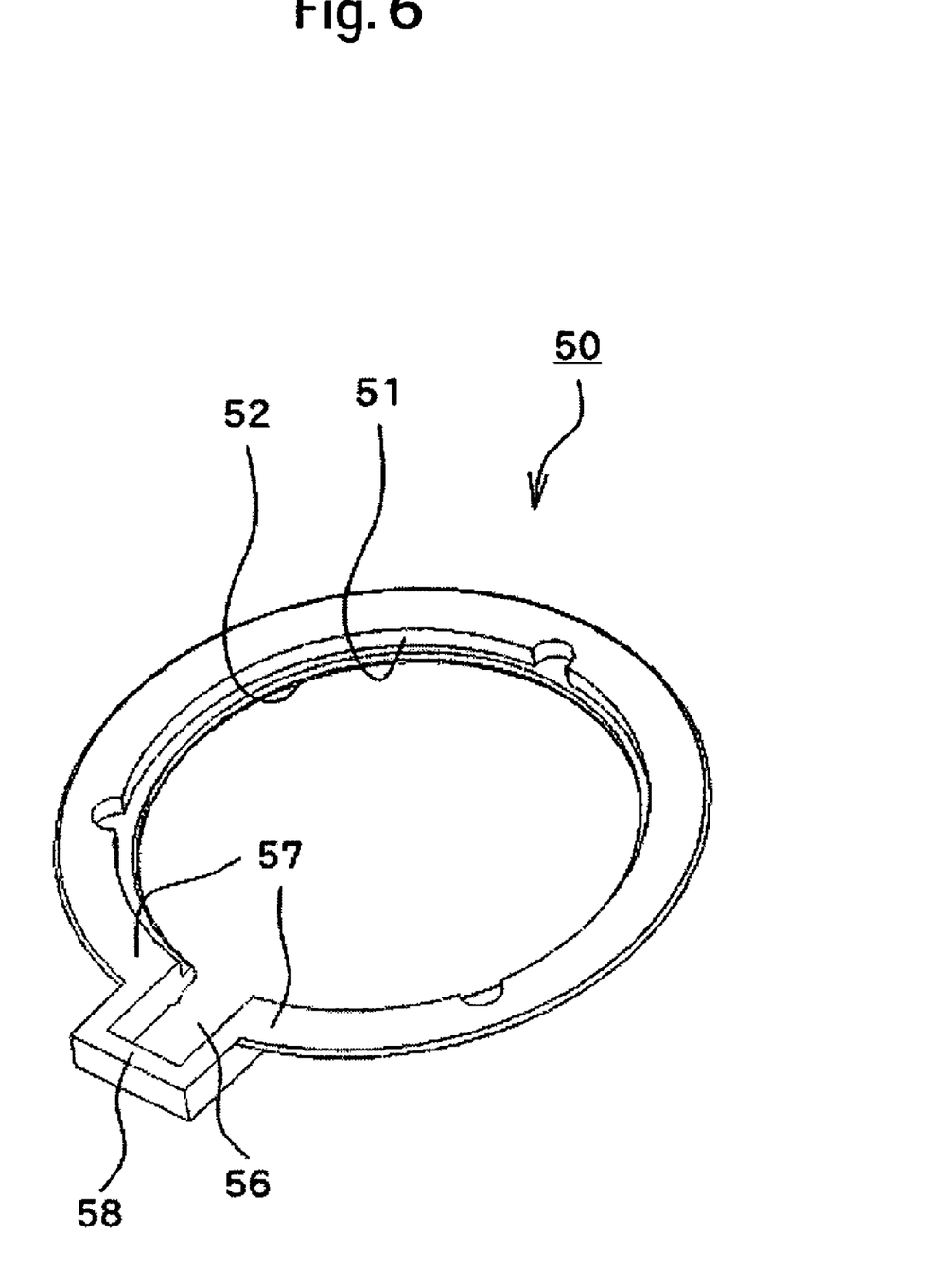
FIG. 6 is a perspective view of another exemplary clamp of the embodiment.

It should be noted that the present invention is not limited to the above magnetic disk drive. Specifically, the clamp 50 is not limited to the configuration shown in FIGS. 4 and 5 in which a portion of the ring shape is simply cut off to provide the slit 56. For example, after forming the slit 56, the end portions 57 may be connected to each other by a connecting portion 58 which protrudes outward from the ring shape in a radial direction, as seen in FIG. 6.

In this case, when the clamp 50 is mounted around the flange portion 62 of the motor hub 60, the protruding connecting portion 58 is subjected to distortion in preference to the ring-shaped portion, thereby widening the slit 56 and hence increasing the distance between the end portions 57. This arrangement allows the inside diameter of the clamp 50 to be easily increased.

Figure 7:
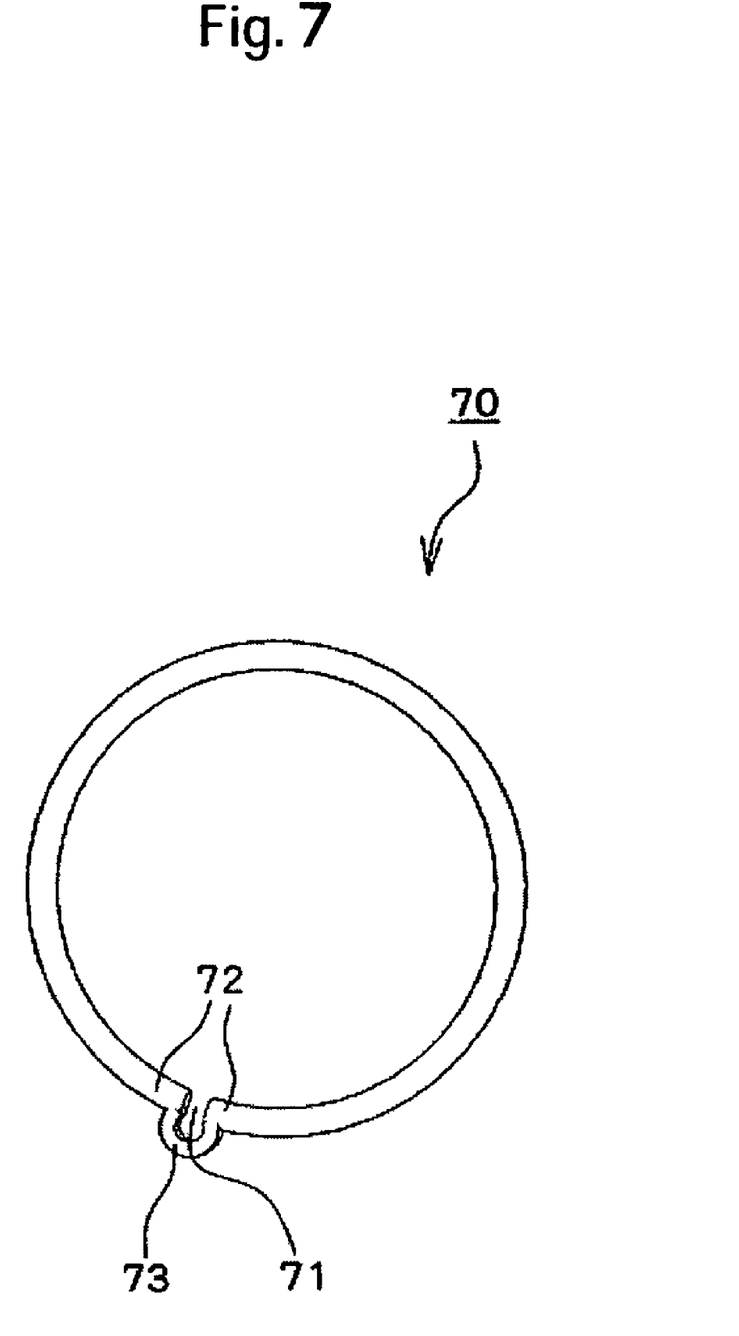
FIG. 7 is a perspective view of an exemplary O-ring of the embodiment.

Likewise, the O-ring 70 may be configured such that a portion of the ring shape is cut off to provide a slit 71, and the end portions 72 separated by the slit 71 are connected to each other by a connecting portion 73 which protrudes outward from the ring shape in a radial direction, as seen in FIG. 7.

In this case, when the O-ring 70 is mounted around the clamp 50, the protruding connecting portion 73 is subjected to distortion in preference to the ring-shaped portion. This arrangement allows the inside diameter of the O-ring 70 to be easily increased.

Further, the magnetic disk drive 1 may include a plurality of magnetic disks 20 instead of one.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a motor hub including a disk support portion and a flange portion, said disk support portion supporting a magnetic disk thereon, said flange portion being located higher than said disk support portion and protruding radially outward with respect to a rotational center of said magnetic disk;
a clamp having a ring shape and including an inclined undersurface inclined downward from the outer circumference of said ring shape toward the inner circumference of said ring shape, said ring shape encircling said flange portion, said clamp being engaged around the outer circumference of said flange portion; and
an O-ring engaged with said inclined undersurface of said clamp so as to press said clamp against said flange portion or clamp said clamp, said O-ring being further engaged with said magnetic disk so as to press said magnetic disk against said disk support portion,
wherein:
said clamp includes a stopper extending downward; and
the distance between said magnetic disk and said stopper is smaller than the distance between said magnetic disk and an arm which supports a magnetic head in such a way that said magnetic head flies over said magnetic disk.

2. The magnetic disk drive as claimed in claim 1, wherein:
said clamp further includes a shoulder portion; and
said shoulder portion is mounted under said flange portion in such a way that said shoulder portion is engaged with an undersurface of said flange portion.

3. The magnetic disk drive as claimed in claim 1, wherein said clamp is formed of a resin material.

4. The magnetic disk drive as claimed in claim 1, wherein to allow the inner diameter of said clamp to be increased when said clamp is mounted on said motor hub, said clamp includes a slit which provides a separation in the circumference of said ring shape of said clamp.

5. The magnetic disk drive as claimed in claim 1, wherein the O-ring is formed of a resin material.

6. A magnetic disk drive comprising:
a motor hub including a disk support portion and a flange portion, said disk support portion supporting a magnetic disk thereon, said flange portion being located higher than said disk support portion and protruding radially outward with respect to a rotational center of said magnetic disk;
a clamp having a ring shape and including an inclined undersurface inclined downward from the outer circumference of said ring shape toward the inner circumference of said ring shape, said ring shape encircling said flange portion, said clamp being engaged around the outer circumference of said flange portion; and
an O-ring engaged with said inclined undersurface of said clamp so as to press said clamp against said flange portion or clamp said clamp, said O-ring being further engaged with said magnetic disk so as to press said magnetic disk against said disk support portion,
wherein to allow the inner diameter of said clamp to be increased when said clamp is mounted on said motor hub, said clamp includes a slit and a connecting portion, said slit providing a separation in the circumference of said ring shape of said clamp, said connecting portion protruding outward from said ring shape in a radial direction and connecting end portions of said ring shape separated by said slit.

7. A magnetic disk drive comprising:
a motor hub including a disk support portion and a flange portion, said disk support portion supporting a magnetic disk thereon, said flange portion being located higher than said disk support portion and protruding radially outward with respect to a rotational center of said magnetic disk;
a clamp having a ring shape and including an inclined undersurface inclined downward from the outer circumference of said ring shape toward the inner circumference of said ring shape, said ring shape encircling said flange portion, said clamp being engaged around the outer circumference of said flange portion; and
an O-ring engaged with said inclined undersurface of said clamp so as to press said clamp against said flange portion or clamp said clamp, said O-ring being further engaged with said magnetic disk so as to press said magnetic disk against said disk support portion,
wherein the O-ring includes a slit and a connecting portion, the slit providing a separation in the circumference of the O-ring, the connecting portion protruding outward from the O-ring in a radial direction and connecting end portions of the O-ring separated by the slit.

8. A magnetic disk drive comprising:
a motor hub including a disk support portion and a flange portion, said disk support portion supporting a magnetic disk thereon, said flange portion being located higher than said disk support portion and protruding radially outward with respect to a rotational center of said magnetic disk;

a clamp having a ring shape and including an inclined undersurface inclined downward from the outer circumference of said ring shape toward the inner circumference of said ring shape, said ring shape encircling said flange portion, said clamp being engaged around the outer circumference of said flange portion; and means for engaging with said inclined undersurface of said clamp so as to press said clamp against said flange portion or clamp said clamp, and engaging with said magnetic disk so as to press said magnetic disk against said disk support portion, wherein:

said clamp includes a stopper extending downward; and the distance between said magnetic disk and said stopper is smaller than the distance between said magnetic disk and an arm which supports a magnetic head in such a way that said magnetic head flies over said magnetic disk.

9. The magnetic disk drive as claimed in claim 8, wherein:

said clamp further includes a shoulder portion; and said shoulder portion is mounted under said flange portion in such a way that said shoulder portion is engaged with an undersurface of said flange portion.

10. The magnetic disk drive as claimed in claim 8, wherein said clamp is formed of a resin material.

11. The magnetic disk drive as claimed in claim 8, wherein to allow the inner diameter of said clamp to be increased when said clamp is mounted on said motor hub, said clamp includes a slit which provides a separation in the circumference of said ring shape of said clamp.

12. A magnetic disk drive comprising:

a motor hub including a disk support portion and a flange portion, said disk support portion supporting a magnetic disk thereon, said flange portion being located higher than said disk support portion and protruding radially outward with respect to a rotational center of said magnetic disk;

a clamp having a ring shape and including an inclined undersurface inclined downward from the outer circumference of said ring shape toward the inner circumference of said ring shape, said ring shape encircling said flange portion, said clamp being engaged around the outer circumference of said flange portion; and means for engaging with said inclined undersurface of said clamp so as to press said clamp against said flange portion or clamp said clamp, and engaging with said magnetic disk so as to press said magnetic disk against said disk support portion, wherein to allow the inner diameter of said clamp to be increased when said clamp is mounted on said motor hub, said clamp includes a slit and a connecting portion, said slit providing a separation in the circumference of said ring shape of said clamp, said connecting portion protruding outward from said ring shape in a radial direction and connecting the end portions of said ring shape separated by said slit.

13. The magnetic disk drive as claimed in claim 12, wherein:

said clamp further includes a shoulder portion; and said shoulder portion is mounted under said flange portion in such a way that said shoulder portion is engaged with an undersurface of said flange portion.

14. The magnetic disk drive as claimed in claim 12, wherein said clamp is formed of a resin material.

15. The magnetic disk drive as claimed in claim 12, wherein to allow the inner diameter of said clamp to be increased when said clamp is mounted on said motor hub, said clamp includes a slit which provides a separation in the circumference of said ring shape of said clamp.

* * * * *